(12) United States Patent
Kim et al.

(10) Patent No.: US 11,284,461 B2
(45) Date of Patent: Mar. 22, 2022

(54) METHOD AND APPARATUS FOR CONTROLLING PACKET TRANSMISSION FOR REDUCING LATENCY IN WIRELESS COMMUNICATION SYSTEM

(71) Applicant: Samsung Electronics Co., Ltd., Suwon-si (KR)

(72) Inventors: Dongsook Kim, Suwon-si (KR); Dongho Kwak, Suwon-si (KR); Hoon Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 16/872,667

(22) Filed: May 12, 2020

(65) Prior Publication Data

US 2020/0367301 A1 Nov. 19, 2020

(30) Foreign Application Priority Data

May 17, 2019 (KR) ........................ 10-2019-0058410

(51) Int. Cl.
*H04W 76/15* (2018.01)
*H04W 28/02* (2009.01)
(Continued)

(52) U.S. Cl.
CPC ....... *H04W 76/15* (2018.02); *H04W 28/0278* (2013.01); *H04W 28/06* (2013.01); *H04W 80/02* (2013.01); *H04W 88/06* (2013.01)

(58) Field of Classification Search
CPC .......................... H04W 52/0229; H04W 88/06
(Continued)

(56) References Cited

U.S. PATENT DOCUMENTS 6,901,496 B1 * 5/2005 Mukund ................. H04L 69/12
710/52
7,003,597 B2 * 2/2006 Georgiou ................ H04L 49/90
710/53
(Continued)

FOREIGN PATENT DOCUMENTS

WO WO-2005067227 A1 * 7/2005 ............. H04L 12/56
WO 2017/076454 A1 5/2017
WO WO-2019196585 A1 * 10/2019 ........... H04L 43/026

OTHER PUBLICATIONS

Performance Evaluation of Routing Method Based on Neighboring Node Information in WMN by Wataru Kobayashi • Kazunori Ueda • Yuta Maruoka Published in: 2015 18th International Conference on Network-Based Information Systems (pp. 424-431) Sep. 2015 (Year: 2015).*

(Continued)

*Primary Examiner* — William D Cumming
(74) *Attorney, Agent, or Firm* — Jefferson IP Law, LLP

(57) ABSTRACT

A method and an apparatus for controlling a packet transmission for a split bearer to reduce latency in a wireless communication system are provided. A method by a third node for controlling a packet transmission for a split bearer connected to a first node and a second node in a wireless communication system includes obtaining information related to a buffer state of each of the first node and the second node, determining a packet arrival time at a terminal through each of the first node and the second node based on the information related to the buffer state of each of the nodes, selecting one of the first node and the second node based on a comparison of the packet arrival time corresponding to the first node with the packet arrival time corresponding to the second node, and transmitting a packet to the terminal through the selected node.

18 Claims, 14 Drawing Sheets

(51) Int. Cl.
*H04W 28/06* (2009.01)
*H04W 80/02* (2009.01)
*H04W 88/06* (2009.01)

(58) Field of Classification Search
USPC .......................................................... 370/389
See application file for complete search history.

(56) References Cited

U.S. PATENT DOCUMENTS

| | | | |
|---|---|---|---|
| 9,838,282 B2 | 12/2017 | Dudda et al. | |
| 9,954,790 B2 | 4/2018 | Hwang et al. | |
| 10,045,360 B2 | 8/2018 | Sang et al. | |
| 10,237,911 B2 | 3/2019 | Zhang et al. | |
| 10,362,625 B2 * | 7/2019 | Kela | H04W 52/0229 |
| 2005/0008011 A1 * | 1/2005 | Georgiou | H04L 49/9078 |
| | | | 370/389 |
| 2014/0341023 A1 | 11/2014 | Kim et al. | |
| 2015/0230248 A1 | 8/2015 | Kim et al. | |
| 2016/0366616 A1 | 12/2016 | Wen et al. | |
| 2018/0007734 A1 * | 1/2018 | Kela | H04W 52/0229 |
| 2018/0123920 A1 | 5/2018 | Dudda et al. | |
| 2018/0343662 A1 | 11/2018 | Sang et al. | |
| 2019/0098640 A1 | 3/2019 | Holakouei et al. | |
| 2020/0367301 A1 * | 11/2020 | Kim | H04W 88/06 |

OTHER PUBLICATIONS

Z. D. Shakir, K. Yoshigoe and R. B. Lenin, "Adaptive buffering scheme to reduce packet loss on densely connected WSN with mobile sink," 2012 IEEE Consumer Communications and Networking Conference (CCNC), 2012, pp. 439-444, doi: 10.1109/CCNC.2012.6181020. Apr. 2012 (Year: 2012).*
Ericsson, "End to End Flow Control in Multi-hop IAB Networks", R2-1814360, 3GPP TSG-RAN WG2 #103bis, Chengdu, P. R. China, Sep. 27, 2018, sections 2.1,2.3.
Zte et al., "Discussion on flow control in IAB", R3-192522, 3GPP TSG RAN WG3 Meeting #104, Reno, NV, USA, May 4, 2019 section 2.2; and figure 1.
CATT, "Consideration of flow control", R2-1816888, 3GPP TSG-RAN WG2 Meeting #104, Spokane, USA, Nov. 2, 2018, sections 2.2-2 4.
International Search Report dated Aug. 14, 2020, issued in International Application No. PCT/KR2020/006270.
Extended European Search Report dated Aug. 25, 2020, issued in European Application No. 20174801.9-1215.

* cited by examiner

METHOD AND APPARATUS FOR CONTROLLING PACKET TRANSMISSION FOR REDUCING LATENCY IN WIRELESS COMMUNICATION SYSTEM

CROSS-REFERENCE TO RELATED APPLICATION

This application is based on and claims priority under 35 U.S.C. § 119 to Korean Patent Application No. 10-2019-0058410, filed on May 17, 2019, in the Korean Intellectual Property Office, the disclosure of which is herein incorporated by reference in its entirety.

BACKGROUND

1. Field

The disclosure relates to a method and an apparatus for controlling a packet transmission for a split bearer to reduce latency in a wireless communication system.

2. Description of Related Art

To meet the increasing demand for wireless data traffic since the deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" communication system or a "post long term evolution (LTE) System." Implementation of the 5G communication system in ultrahigh frequency (mmWave) bands (e.g., 60 GHz bands), is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multicarrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched.

Further, such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In a 5G technology, none stand-alone (NSA) new radio (NR) standards for operating both an LTE technology and a new radio (NR) technology have been introduced, and an EUTRA NR dual connectivity (EN-DC) structure between an LTE base station and an NR base station is supported. In such a multi-radio access technology (multi-RAT) DC type connection structure, a device, such as a terminal, may perform radio access in consideration of one of an LTE base station and an NR base station as a master node and the other thereof as a secondary node.

A base station may support a DC for a terminal through a split bearer. A base station may transmit and receive data for a terminal through a split bearer composed of a radio bearer related to a radio link control (RLC) of a master node and a radio bearer related to an RLC of a secondary node in consideration of one packet data convergence protocol (PDCP) as an anchor point. As described above, if a DC for a terminal in the form of a split bearer is supported, data packets may be transmitted from one PDCP through any one of the radio bearer related to the master node and the radio bearer related to the secondary node.

For example, if packets to be transmitted are identified, the PDCP of the base station, in accordance with an secondary cell group (SCG) preferred policy, may transmit the data packets preferentially to the radio bearer related to the RLC of the secondary node. As another example, in accordance with a business policy, the PDCP of the base station may transmit the data packets to the radio bearer related to the RLC of a preconfigured node.

The PDCP of the terminal that receives the data packets through the split bearer may reorder the packets received through the radio bearer related to the master node and the radio bearer related to the secondary node, and the PDCP may transmit the reordered packets to a higher layer. In this case, if there is a big difference in reception time between the data packet received from the radio bearer related to the master node and the data packet received from the radio bearer related to the secondary node, a problem that the reordering time is lengthened occurs.

As an example, if a path for transmitting the data packet is selected preferentially to the secondary node between the master node and the secondary node, a transmission latency occurs in the transmission path of the data packet through the secondary node in the case where the data packet of a specific value or more has been buffered in the RLC of the secondary node. Accordingly, on the side of the terminal, the reordering time may be increased due to the increase of the difference in reception time between the packets received from the master node and the secondary node, respectively.

As described above, if the transmission path of the data packets is determined in accordance with the preconfigured policy regardless of the current buffering state of the master node and the secondary node or the quantity of packets to be transmitted by the PDCP, the total throughput is reduced in accordance with the increase of the reordering time, and in particular, if a packet loss occurs, a longer time is consumed in recovering the throughput.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for configuring a transmission path of a packet, which can reduce the reordering time at a receiving end.

Another aspect of the disclosure is to provide a method and an apparatus for generating and reporting information related to a buffer state of each node connected to a split bearer in order to configure and control a packet transmission path.

Additional aspects will be set forth in part in the description which follows and, in part, will be apparent from the description, or may be learned by practice of the presented embodiments.

In accordance with an aspect of the disclosure, a method performed by a third node for controlling a packet transmission for a split bearer connected to a first node and a second node in a wireless communication system is provided. The method includes obtaining information related to a buffer state for each of the first node and the second node, determining a packet arrival time at a terminal through each of the first node and the second node, based on the information related to the buffer state for each of the first node and the second node, selecting one of the first node and the second node based on a comparison of a packet arrival time corresponding to the first node with a packet arrival time corresponding to the second node, and transmitting a packet to the terminal through the selected node.

In accordance with another aspect of the disclosure, a method by a first node is provided. The method includes generating information related to a buffer state based on an average packet throughput, transmitting the generated information related to the buffer state to a third node controlling a packet transmission for a split bearer connected to the first node and a second node, and transmitting a packet to a terminal if the packet is received from the third node, wherein the information related to the buffer state is used for the third node to determine a packet arrival time at the terminal through the first node, and wherein the packet is received if the first node is selected by the third node based on a comparison of the packet arrival time corresponding to the first node with a packet arrival time corresponding to the second node.

In accordance with another aspect of the disclosure, a third node for controlling a packet transmission for a split bearer connected to a first node and a second node in a wireless communication system is provided. The third node includes a transceiver, and at least one processor configured to obtain information related to a buffer state for each of the first node and the second node, determine a packet arrival time at a terminal through each of the first node and the second node, based on the information related to the buffer state for each of the first node and the second node, select one of the first node and the second node based on a comparison of a packet arrival time corresponding to the first node with a packet arrival time corresponding to the second node, and control the transceiver to transmit a packet to the terminal through the selected node.

In accordance with another aspect of the disclosure, a first node is provided. The first node includes a transceiver, and at least one processor configured to generate information related to a buffer state based on an average packet throughput, transmit the generated information related to the buffer state to a third node controlling a packet transmission for a split bearer connected to the first node and a second node, and control the transceiver to transmit a packet to a terminal if the packet is received from the third node, wherein the information related to the buffer state is used for the third node to determine a packet arrival time at the terminal through the first node, and wherein the packet is received if the first node is selected by the third node based on a comparison of the packet arrival time corresponding to the first node with a packet arrival time corresponding to the second node.

According to an embodiment of the disclosure, the PDCP of the receiving end can effectively reduce the reordering time by minimizing the transmission latency difference between data through two radio bearers while maximally securing the data speeds in the two radio bearers constituting the split bearer. Accordingly, the problem caused by the expiration of the reordering timer can be solved, and the transmission control protocol (TCP) round trip time (RTT) can be minimized to improve the TCP throughput.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

Figure 1:
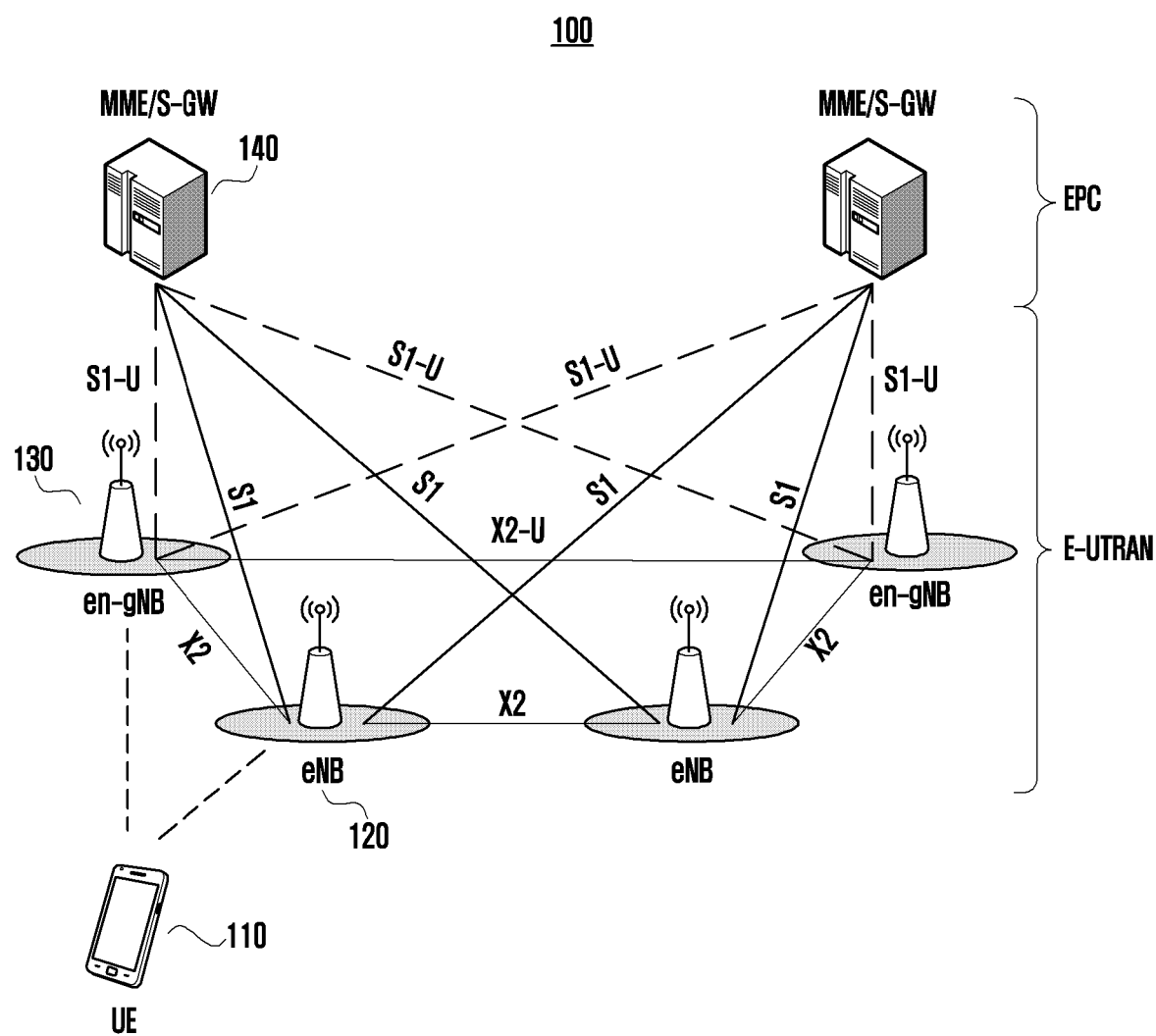
FIG. 1 is a diagram explaining a DC according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure+. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors.

Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Hereinafter, preferred embodiments of the disclosure will be described in detail with reference to the accompanying drawings. For convenience in explanation, terms and names defined in the 3rd generation partnership project (3GPP) long term evolution (LTE), LTE advanced (LTE-A), 5th generation (5G), and new radio (NR) standards may be partly used. However, the disclosure is not restricted by the terms and names in the above-described standards, and it may be equally applied to systems complying with other standards.

Hereinafter, a terminal may include user equipment (UE), mobile station (MS), cellular phone, smart phone, computer, or multimedia system capable of performing a communication function. Further, a base station may include an evolved Node B (eNB), gNB, Node B, radio access unit, transmission and reception point (TRP), or node.

A wireless communication system was initially developed for the purpose of providing a voice-oriented service, but has been expanded to, for example, a broadband wireless communication system that provides high-speed and high-quality packet data services in the communication standards, such as 3GPP high speed packet access (HSPA), long term evolution (LTE) or evolved universal terrestrial radio access (E-UTRA), LTE-A, LTE-Pro, 3GPP2 high rate packet data (HRPD), ultra mobile broadband (UMB), and IEEE 802.16e.

In an NR system that is a representative example of the broadband wireless communication systems, a downlink (DL) adopts an orthogonal frequency division multiplexing (OFDM) scheme, and an uplink (UL) adopts a single carrier frequency division multiple access (SC-FDMA) or discrete Fourier transform spread OFDM (DFT-S-OFDM) scheme. The uplink means a radio link in which a terminal transmits data or a control signal to a base station, and the downlink means a radio link in which a base station transmits data or a control signal to a terminal. According to the above-described multiple access schemes, data of respective users or control information can be discriminated from each other by performing an allocation and an operation so as to prevent time-frequency resources for carrying the data or control information for each terminal from overlapping each other, that is, to establish orthogonality.

In a 5G communication system, it is necessary to freely reflect various requirements of users and service providers, and services satisfying the various requirements should be supported. Services being considered for the 5G communication system may be enhanced mobile broadband (eMBB), massive machine type communication (mMTC), and ultra-reliability low-latency communication (URLLC).

The eMBB aims at providing of more improved data rate than the data rate supported by the existing LTE, LTE-A, or LTE-Pro. For example, in the 5G communication system, it is required that, from the viewpoint of one base station, the eMBB provides a peak data rate of 20 Gbps on the downlink and a peak data rate of 10 Gbps on the uplink. At the same time, the 5G communication system should provide an actual user perceived data rate of increased terminals. In order to satisfy such requirements, in the 5G communication system, improvement of transmission/reception technologies including an improved multi input multi output (MIMO) transmission technology is required. Further, it is possible to satisfy the data rate required in the 5G communication system by using a frequency bandwidth that is wider than 20 MHz in the frequency band of 3 to 6 GHz or 6 GHz or more instead of the 2 GHz band used in the LTE.

In order to support application services, such as the Internet of things (IoT), in the 5G communication system, the mMTC is under consideration. In order to efficiently provide the Internet of things in the mMTC, massive terminal access support, terminal coverage improvement, improved battery time, and terminal cost reduction are required in a cell. Since the Internet of things is attached to various sensors and appliances to provide communication functions, it should support a large number of terminals (e.g., 1,000,000 terminals/km$^2$) in the cell. Further, since there is a high possibility that a terminal supporting the mMTC is located in a shaded area that is unable to be covered by the cell, such as underground of a building, due to the characteristics of the service, a wider coverage is demanded as compared with other services. The terminal supporting the mMTC should be configured as an inexpensive terminal, and since it is difficult to frequently replace a battery of the terminal, a very long battery life time, such as 10 to 15 years, may be required.

Last, the URLLC is a cellular-based wireless communication service that is used for a specific purpose (mission-critical), and it is used for remote control of a robot or machinery, industrial automation, unmanned aerial vehicle, remote health care, and emergency alert. Accordingly, the URLLC should provide communications providing ultra-low latency and ultra-reliability. For example, a service supporting the URLLC should satisfy air interface latency that is shorter than 0.5 millisecond and packet error rate requirements of $10^{-5}$ or less at the same time. Accordingly, for the service supporting the URLLC, the 5G system should provide a transmit time interval (TTI) that is shorter than that of other services, and the service should allocate wide resources in the frequency band. However, the above-described mMTC, URLLC, and eMBB are merely examples of different service types, and the service types to which the disclosure is applied are not limited to those as exemplified above.

The services being considered in the above-described 5G communication system should be converged and provided based on one framework. That is, for efficient resource management and control, it is preferable that the respective services are integrally controlled and transmitted through one system rather than being independently operated.

Hereinafter, although embodiments of the disclosure will be described in a state where an LTE, LTE-A, LTE-Pro, or NR system is exemplified, they may also be applied even to other communication systems having similar technical backgrounds or channel types. Further, embodiments of the disclosure may also be applied to other communication systems through partial modifications thereof within the range that does not greatly deviate from the scope of the disclosure by the judgment of those skilled in the art.

FIG. 1 is a diagram explaining a DC according to an embodiment of the disclosure.

Referring to FIG. 1, the DC 100 corresponds to a situation in which a terminal is simultaneously connected to two base stations, and communicates with the respective base stations using radio resources provided by the respective base stations. Because the DC is configured to the terminal, throughput being provided to the terminal can be increased, and a data transmission speed can also be improved. In the DC, the base station that controls a primary cell (PCell) being served to the terminal may be called a master node (MN) or a master base station, and the base station that controls only a secondary cell (SCell) excluding the PCell may be called a secondary node (SN) or a secondary base station. In this case, a group of one or more cells supported by the MN with respect to the terminal is called a master cell group (MCG), and a group of one or more cells supported by the SN with respect to the terminal is called a secondary cell group (SCG).

The DC is a situation in which two different nodes, which are connected to each other through non-ideal backhaul or ideal backhaul, perform communication with a terminal by allocating radio resources to the terminal. In the DC, if the MN is an LTE base station (i.e., eNB) connected to an evolved packet core (EPC), and the SN is an NR base station (i.e., gNB) connected to a 5G core (5GC), the DC is called an EUTRA-NR DC (EN-DC). In particular, the NR base station operating in the EN-DC may be called an en-gNB. For example, the terminal 110 in FIG. 1 may be configured with the DC in which the eNB 120 is the MN and the gNB 130 is the SN. The terminal may transmit and receive data packets through connection to an EPC network entity 140

(e.g., mobility management entity (MME) or serving gateway (S-GW)) through the eNB 120 and the gNB 130.

Separately from the situation illustrated in FIG. 1, different DC scenarios, such as NG-RAN E-UTRA-NR dual connectivity (NGEN-DC), NR-E-UTRA dual connectivity (NE-DC), and NR-NR dual connectivity (NR-DC), may be considered in accordance with core networks of two base stations connected to a terminal and a radio access technology (RAT), and they may be commonly called multi radio dual connectivity (MR-DC). The above-described EN-DC may mean an MR-DC scenario connected to the EPC.

As described above, various scenarios may be considered in the DC, and hereinafter, a protocol stack of the base station and the terminal in consideration of the EN-DC is taken as a representative example.

Figure 2A:
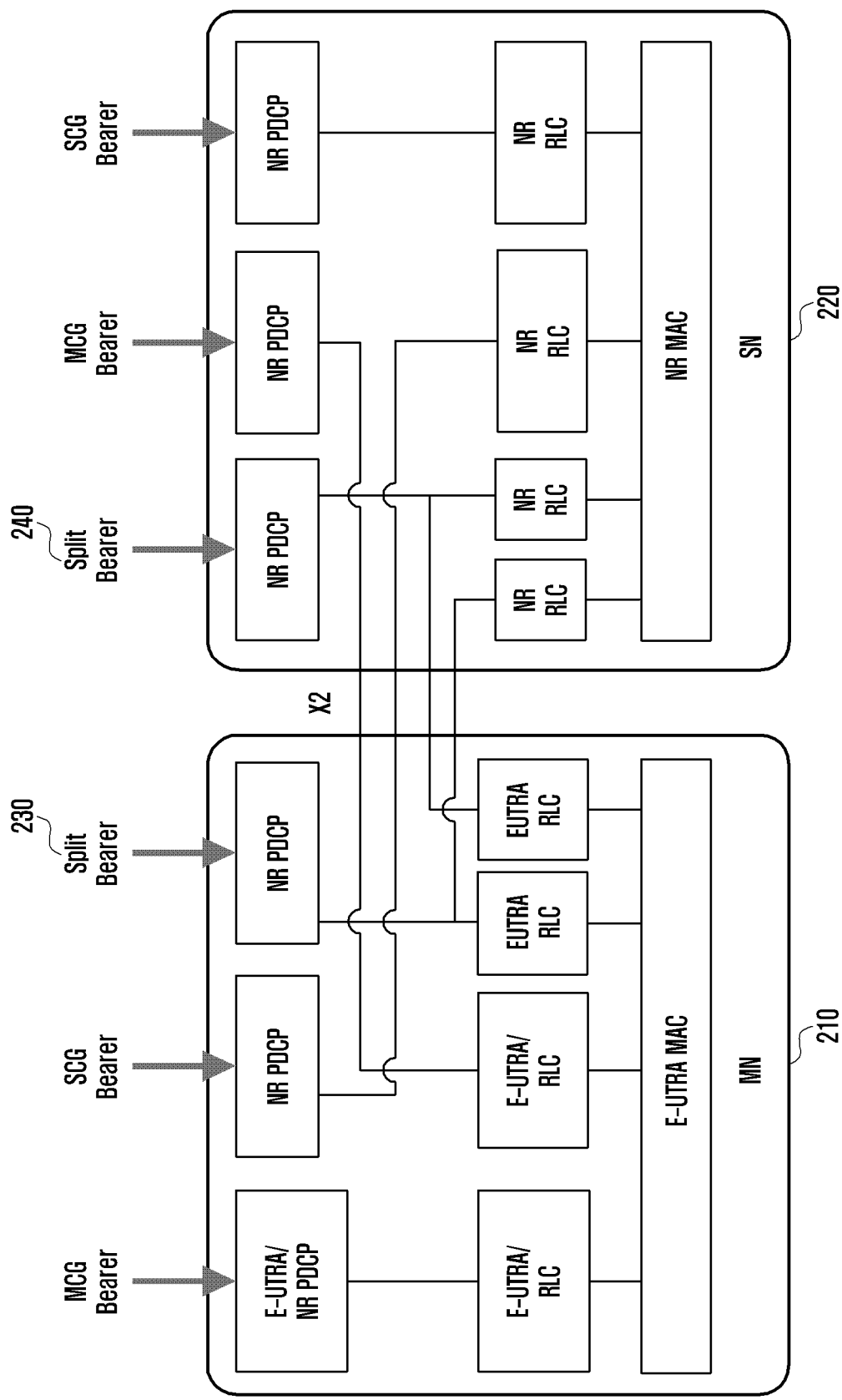
FIG. 2A is a diagram explaining a part of a protocol stack of a base station that can be applied to a DC according to an embodiment of the disclosure.
Figure 2B:
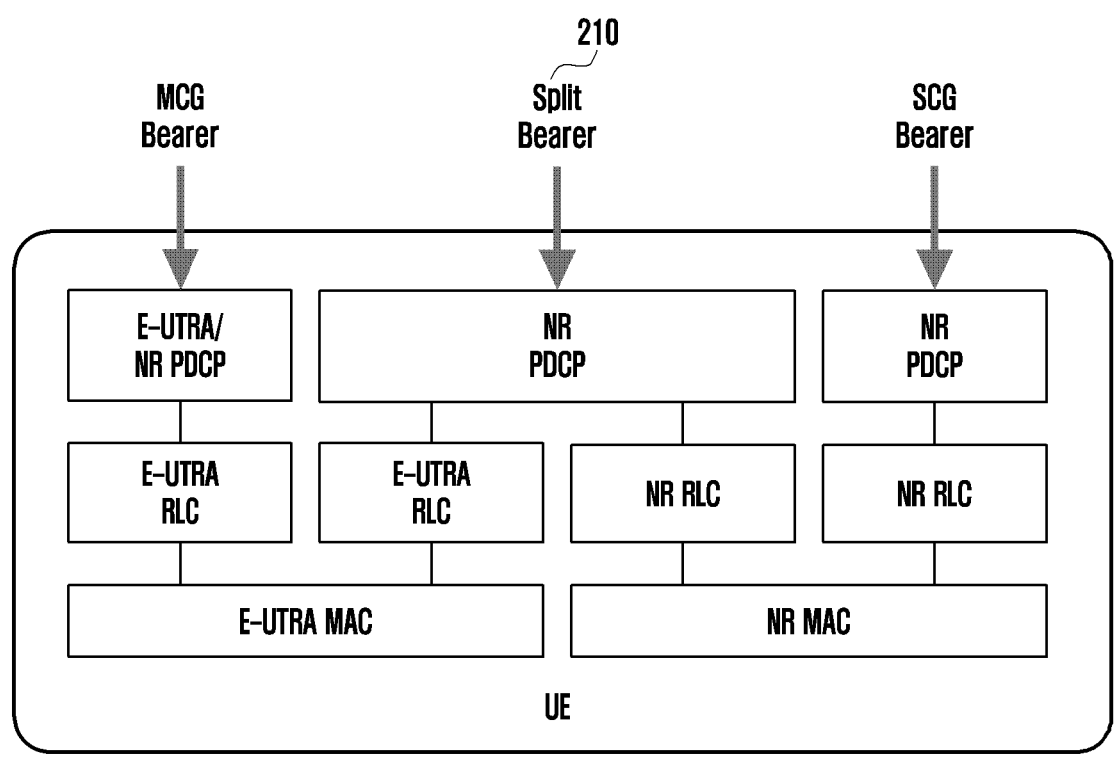
FIG. 2B is a diagram explaining a part of a protocol stack of a terminal that can be applied to a DC according to an embodiment of the disclosure.

FIGS. 2A and 2B are diagrams explaining parts of protocol stacks of a base station and a terminal, which can be applied to a DC according to various embodiments of the disclosure.

Referring to FIG. 2A, if the EN-DC is configured in the terminal, three kinds of bearers, e.g., MCG bearer, SCG bearer, and split bearer, may be configured in MN 210 and SN 220. The MCG bearer means a radio bearer connected to a radio link control (RLC) bearer for the MCG, and the SCG bearer means a radio bearer connected to an RLC bearer for the SCG. The split bearers 230 and 240 mean radio bearers connected to both the RLC bearer for the MCG and the RLC bearer for the SCG. The split bearers 230 and 240 may be considered with respect to both an MN terminated bearer connected to a packet data convergence protocol (PDCP) of the MN and an SN terminated bearer connected to a PDCP of the SN. In this case, with respect to the split bearers 230 and 240, an NR PDCP is applied to both the MN and the SN.

Even with respect to the terminal, the protocol stack corresponding to the base station as described above with reference to FIG. 2A is considered. Referring to FIG. 2B, the PDCP of the terminal serves to connect a split bearer 210 to an MN RLC bearer for connection with the MN and an SN RLC bearer for connection with the SN, respectively, and the PDCP serves to route uplink data packets of the split bearer 210. Further, the PDCP of the terminal services to perform reordering when receiving a PDCP PDU.

As described above, examples of the protocol stacks of the terminal and the base station that are applicable to the EN-DC have been described. Meanwhile, the explanation of the bearer may also be applied even to an MR-DC scenario connected to the 5GC in a similar manner, and there is a different point that a service data adaptation protocol (SDAP) layer may be further included in the MR-DC. The SDAP serves to process and map a quality of service (QoS) flow onto the radio bearer, and the SDAP layer may be located on the PDCP layer.

Figure 3:
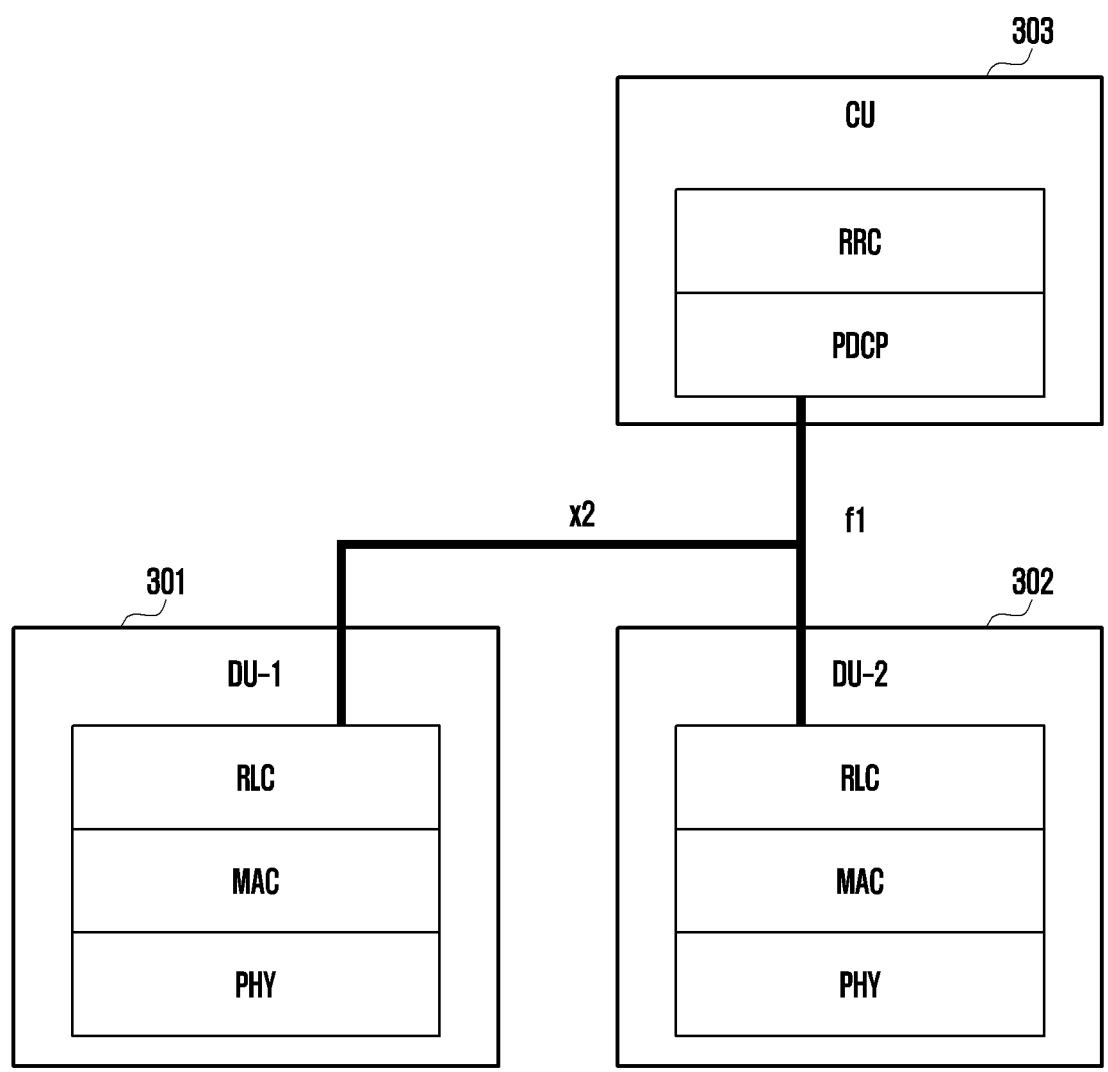
FIG. 3 is a diagram illustrating the structures of base stations separated in accordance with a protocol stack according to an embodiment of the disclosure.

FIG. 3 is a diagram illustrating the structures of base stations separated in accordance with a protocol stack according to an embodiment of the disclosure.

Referring to FIG. 3, a base station may be composed of a CU base station including a radio resource control (RRC) layer and a packet data convergence protocol (PDCP) layer and a DU base station including a radio link control (RLC) layer, a medium access control (MAC) layer, and a physical (PHY) layer. The CU base station and the DU base station may be implemented as separate base stations, and they can perform base station operations, respectively. Hereinafter, the terms of the CU base station and the DE base station are interchangeably used with the CU node and the DU node.

Functions of the respective layers are as follows. The PDCP layer service serves to perform IP header compression/restoration, and the RLC layer serves to perform an error correction operation through an ARQ. The MAC layer is connected to several RLC layers, and RLC PDUs are multiplexed to form a MAC PDU, and the RLC PDUs are demultiplexed from the MAC PDU. The PHY layer performs channel coding and modulation of higher layer data and makes OFDM symbols to transmit the OFDM symbols on a radio channel, or the PHY layer demodulates the OFDM symbols received on the radio channel and performs channel decoding of the demodulated OFDM symbols to transfer the channel-decoded data to a higher layer. Further, the PHY layer uses a hybrid ARQ (HARQ) for error correction together with the MAC layer, and this is called HARQ ACK/NACK information. Meanwhile, the RRC layer is defined only on a control plane, and it serves to control other channels related to configuration, reconfiguration, and release of the radio bearers.

Referring to FIG. 3, the base station according to an embodiment of the disclosure may distinguish the protocol stacks included in one base station by functions, and it may separately construct the central unit (CU) node and the distributed unit (DU) node. FIG. 3 illustrates the structure of the base station in the case where a DC connection is configured between the master node and the secondary node, and the split bearer is constructed by the radio bearer related to the mater node and the radio bearer related to the secondary node. As illustrated in FIG. 3, the CU node 303 may be connected to the first DU node 301 through an X2 interface, and it may be connected to the second DU node 302 through a fronthaul f1.

Figure 4A:
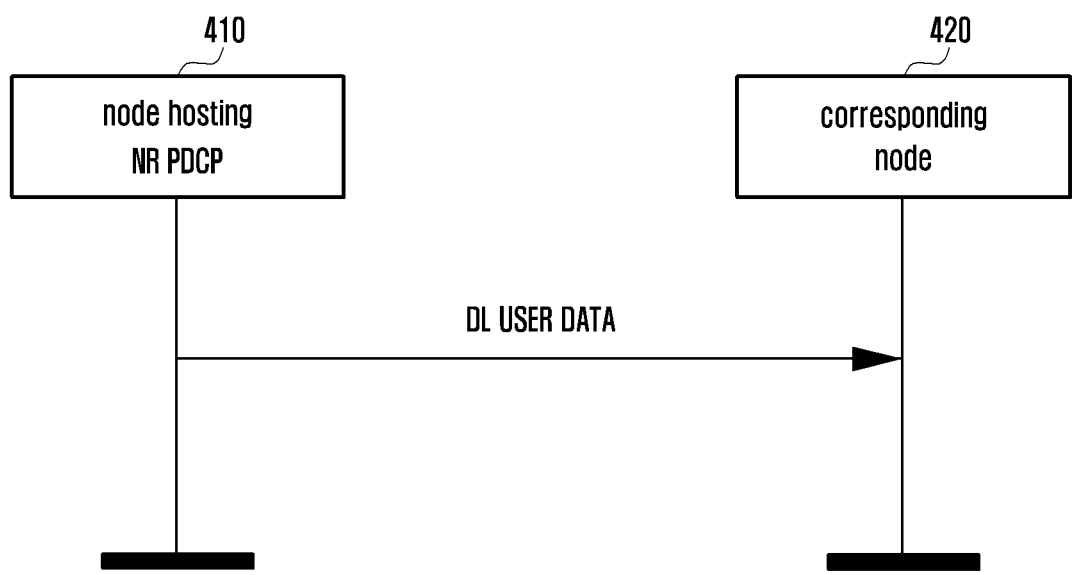
FIG. 4A is a diagram explaining signaling between nodes constituting a DC according to an embodiment of the disclosure.
Figure 4B:
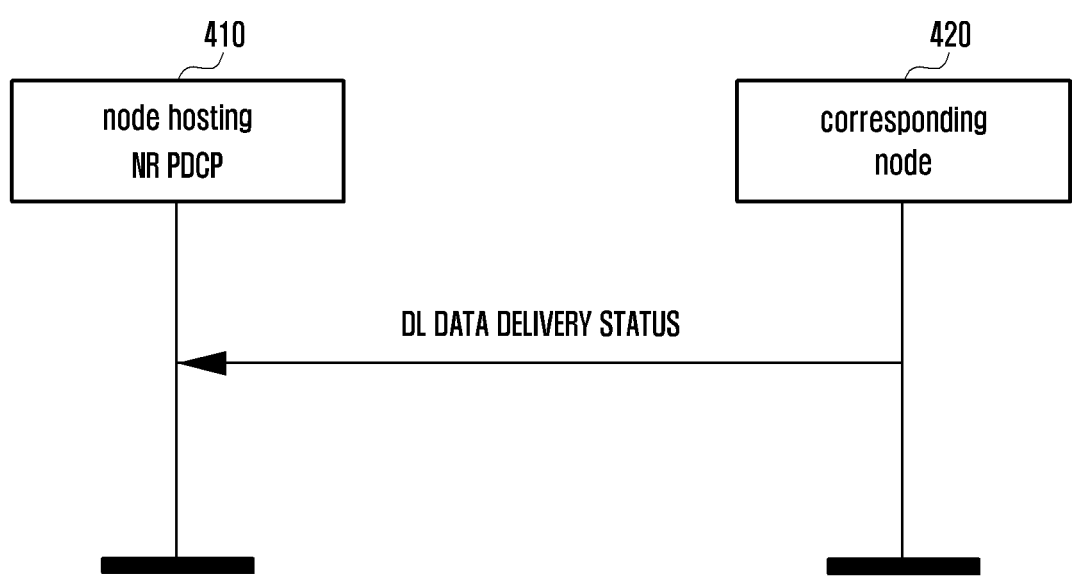
FIG. 4B is a diagram explaining signaling between nodes constituting a DC according to an embodiment of the disclosure.

FIGS. 4A and 4B are diagrams explaining signaling between nodes constituting a DC according to various embodiments of the disclosure.

FIGS. 4A and 4B illustrate a signaling procedure related to a process in which an NR transmits and receives downlink (DL) user plane data. In the NR, the PDCP serves to transmit the user plane data, and such a downlink data transmission procedure may be understood as a process in which a node 410 hosting the NR PDCP transmits data (e.g., PDCP protocol data unit (PDU)) to a corresponding node 420.

The host node 410 and the corresponding node 420 can be implemented in one base station. In the case of the DC split bearer as described above, the host node 410 and the corresponding node 420 may be implemented in different base stations. In the case of an MN terminated bearer, the host node 410 becomes the MN, and the corresponding node 420 becomes the SN, whereas in the case of the SN terminated bearer, the host node 410 becomes the SN, and the corresponding node 420 becomes the MN.

On the other hand, it may be understood that the host node 410 corresponds to a CU having a central unit-distributed unit (CU-DU) separation structure on the point that the host node 410 is a node on which the PDCP is located. In this case, it may be understood that the corresponding node 420 corresponds to a DU having the CU-DU separation structure. The CU-DU separation structure is a structure in which the base station is implemented to be functionally or hierarchically separated, and thus it has a structure in which the CU and the DU perform partial operations of the whole base station. For example, the CU may be in charge of radio resource control (RRC) and PDCP functions of the base station, and the DU may be in charge of RLC, medium access control (MAC), and physical (PHY) functions of the base station.

In addition to such a separated implementation scheme, the CU and the DU can be separately implemented to take charge of other layers/functions. Meanwhile, the CU and the DU may be understood as respective independent base stations (or nodes) on the point that they can be physically separated and implemented. In other words, the "base station" may be the concept of explaining the CU, the DU, or both the CU and the DU.

FIG. 4A is a diagram explaining signaling between nodes constituting a DC according to an embodiment of the disclosure.

Referring to FIG. 4A, the host node 410 transmits downlink user data to the corresponding node 420. The corresponding node 420 may transmit the received downlink user data to the terminal through transfer of the downlink user data to a lower layer.

FIG. 4B is a diagram explaining signaling between nodes constituting a DC according to an embodiment of the disclosure.

Referring to FIG. 4B, the corresponding node 420 transmit a DL data delivery status (DDDS) to the host node 410. The DDDS is feedback information for making the corresponding node 420 control a flow of the downlink user data by the host node 410, and the host node 410 may transmit the downlink user data to the corresponding node 420 based on the DDDS received from the corresponding node 420. For example, the host node 410 may determine the amount of data to be transmitted to the corresponding node 420 based on a desired buffer size and a desired data rate included in the DDDS.

The DDDS may be used for the purpose of controlling the host node 410 to successfully transfer DL control data to the corresponding node 420. The DDDS may be periodically transmitted from the corresponding node 420 to the host node 410, may be transmitted in accordance with a request from the host node 410, or may be transmitted to the host node 410 in the case where the PDCP PDU corresponding to a specific sequence number is successfully transferred in sequence.

Figure 5:
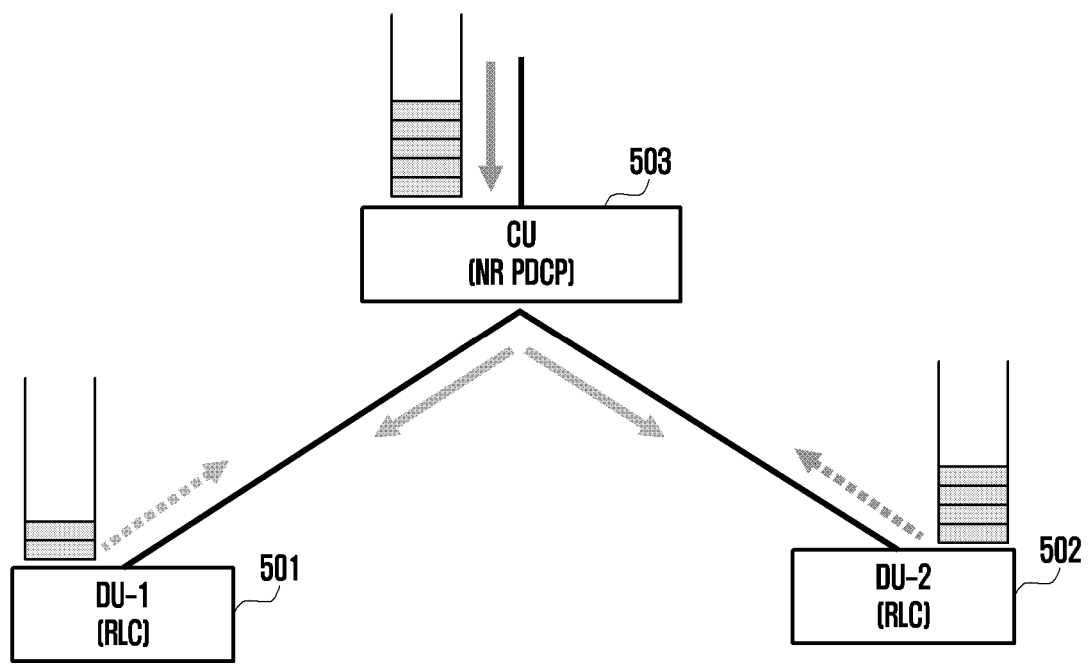
FIG. 5 is a conceptual diagram illustrating signaling for configuring a packet transmission path according to an embodiment of the disclosure.

FIG. 5 is a conceptual diagram illustrating signaling for configuring a packet transmission path according to an embodiment of the disclosure.

Referring to FIG. 5, according to an embodiment of the disclosure, a DC may be configured with respect to a terminal, and packet transmission/reception for the terminal may be performed through a split bearer. In this case, the packet being transmitted to the terminal may be transmitted through any one of a first DU node 501 and a second DU node 502 selected by a CU node 503. The first DU node and the second DU node may correspond to any one of a mater node and a secondary node. The first DU node may be a node including an RLC of the master node, and the second DU node may be a node including an RLC of the secondary node. In contrast, the first DU node may be a node including the RLC of the secondary node, and the second DU node may be a node including the RLC of the master node.

In this case, it is necessary for the CU node to properly select a node that can transfer the packet to the terminal most quickly in consideration of the states of the DU nodes.

For this, according to an embodiment of the disclosure, the DU nodes connected to the split bearer may periodically report information related to the states of the respective DU nodes to the CU node as illustrated in FIG. 5. The information related to the states of the respective DU nodes may be transferred, for example, through the DDDS as described above with reference to FIG. 4. The information related to the states of the respective DU nodes may include information related to the buffer states of the respective DUs. Hereinafter, what information the state related information, which is transmitted from the respective DU nodes to the CU node, includes, on the basis of what information the state related information is generated, and how the state related information is transmitted to the CU node will be described later with reference to FIGS. 6 and 7.

The CU node according to an embodiment of the disclosure may identify the states of the respective DU nodes based on the information acquired from the respective DU nodes, and it may store and manage the information on the respective DU nodes. If a packet to be transmitted to the terminal is generated, the CU node may determine a proper path for transmitting the corresponding packet in consideration of the size of the packet and the identified states of the respective DU nodes. Hereinafter, a detailed method by the CU node according to an embodiment of the disclosure for determining a transmission path of a packet to be transmitted in the case that the corresponding packet is generated, and how to use the size information of the corresponding packet or the information acquired from the DU, will be described in more detail based on FIGS. 9 to 11.

According to an embodiment of the disclosure, the packets, which were transmitted simply by the existing operator policy or only to preconfigured specific node, can be transmitted to the terminal through a proper path in accordance with the states of the respective DU nodes or the packet state at a transmission time, and thus throughput can be improved. In particular, in the terminal, the problem in the related art that the reordering time is increased due to the difference in reception time between the packets received from the respective nodes connected to the split bearer can be solved.

Hereinafter, for convenience in explanation, it is intended that a first DU node according to an embodiment of the disclosure is interchangeably used with the term "a first node", and a second DU node is interchangeably used with the term "a second node", and a CU node is interchangeably used with the term "a third node".

Hereinafter, with reference to FIGS. 6 to 8, an operation of a DU node according to an embodiment of the disclosure will be described in detail. The DU node according to an embodiment of the disclosure, as described hereinafter, may correspond to any one of a node including an RLC of a master node and a node including an RLC of a secondary node. In the disclosure, the operation of the DU node is commonly applied to the master node and the secondary node, and hereinafter, for convenience, explanation will be made based on the first node.

Figure 6:
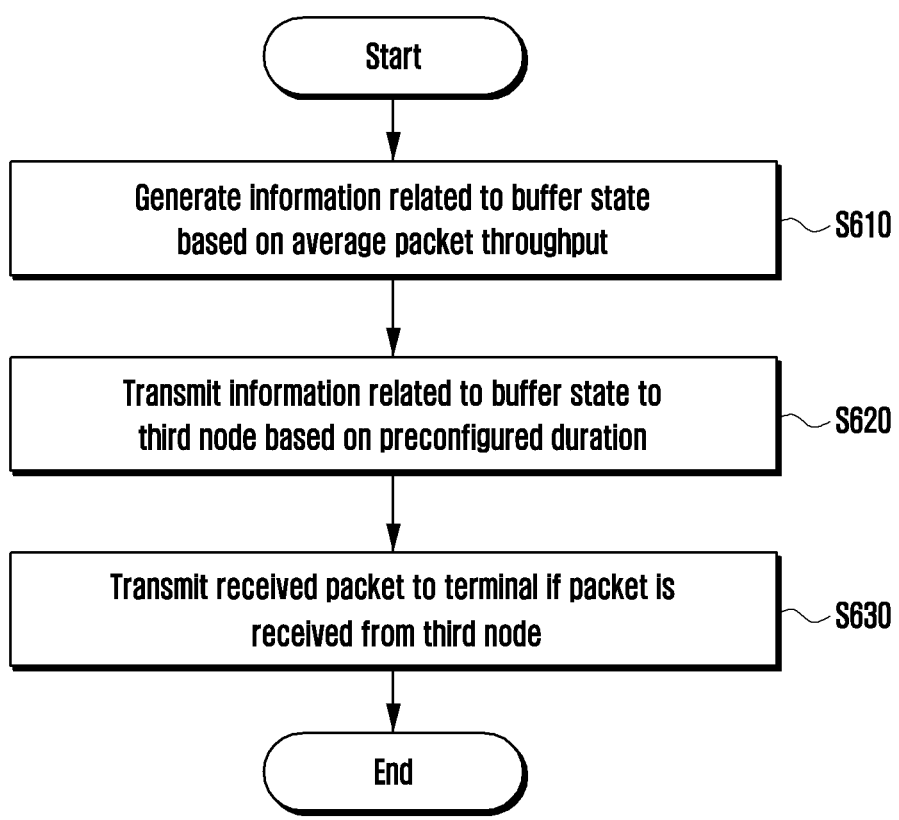
FIG. 6 is a flowchart explaining a method for reporting state information of a first node according to an embodiment of the disclosure.

FIG. 6 is a flowchart explaining a method for reporting state information of a first node according to an embodiment of the disclosure.

Referring to FIG. 6, a first node according to an embodiment of the disclosure may generate information related to a buffer state based on an average packet throughput at operation S610.

The first node according to an embodiment of the disclosure may generate the information related to the buffer state that is used to configure a transmission path of a packet. The information related to the buffer state may mean, for example, size information of a buffer of the first node capable of buffering the packet being subsequently received, or buffer size information corresponding to packet data that can be additionally received in accordance with the current buffer state or packet data of which the transmission is requested.

The information related to the buffer state according to an embodiment of the disclosure may be generated based on the average packet throughput of the first node for the purpose of requesting packets enough to secure the average packet throughput of each node from a third node. More specifically, a method how to generate the information related to the buffer state according to an embodiment of the disclosure will be described later with reference to FIG. 7.

If the information related to the buffer state is generated as described above, the first node according to an embodiment of the disclosure may transmit the information related to the buffer state to the third node according to an embodiment of the disclosure in a preconfigured duration at operation S620.

Because the first node according to an embodiment of the disclosure does not continuously buffer the packets in a buffer, but transmits the packet to the terminal at a specific speed, and receives the packet transferred from the third node, the buffer state may be continuously changed. Accordingly, the first node according to an embodiment of the disclosure may transmit the information related to the buffer state in a preconfigured duration so that the third node can obtain the buffer state of the first node that is continuously changed.

Thereafter, if the packet is received from the third node, which selects a radio bearer corresponding to the first node as a proper transmission path, the first node may transmit the received packet to the terminal at operation S630.

Figure 7:
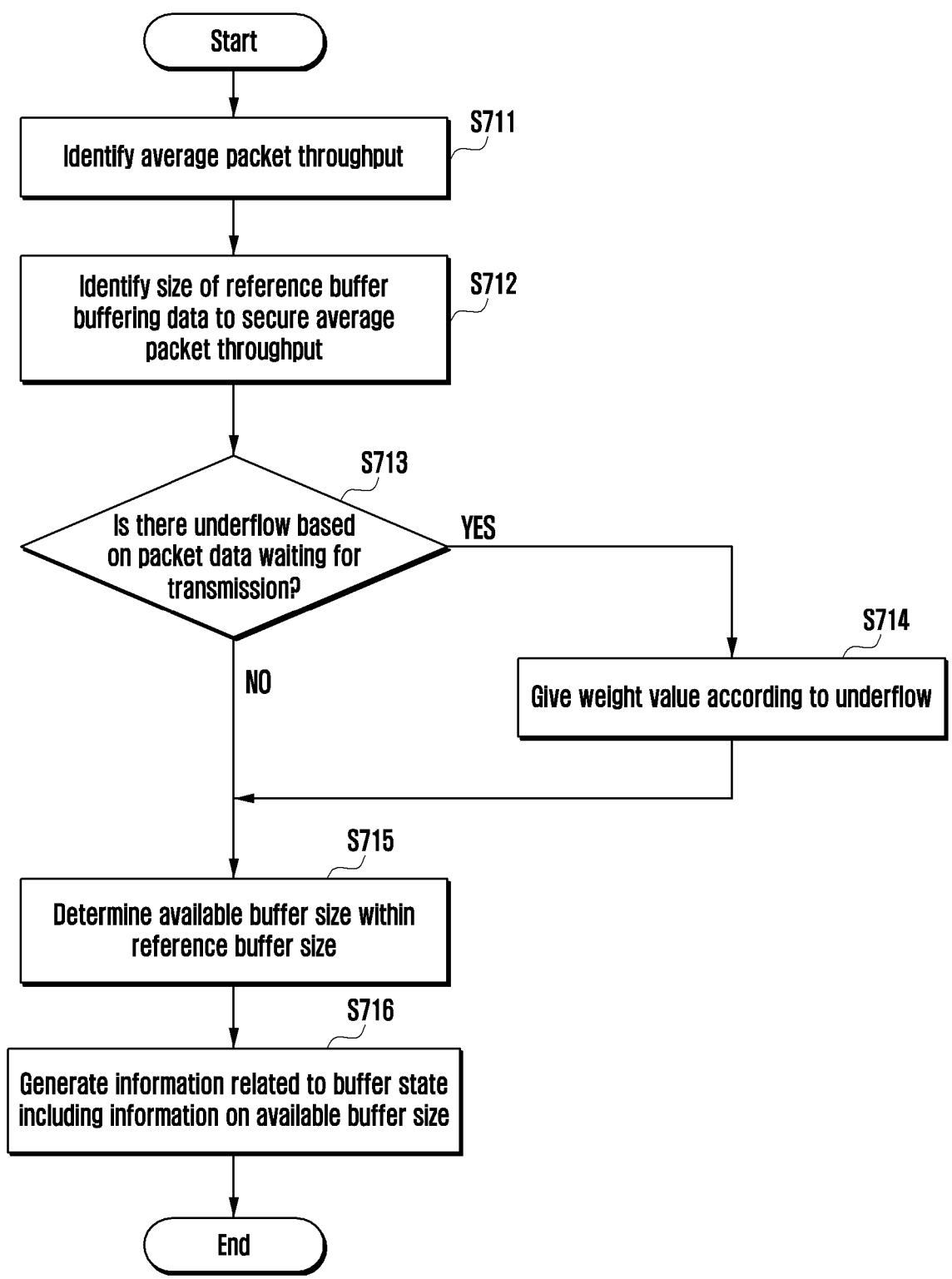
FIG. 7 is a flowchart explaining a method by a first node for generating information related to a buffer state according to an embodiment of the disclosure.

FIG. 7 is a flowchart explaining a method by a first node for generating information related to a buffer state according to an embodiment of the disclosure.

Referring to FIG. 7, a first node according to an embodiment of the disclosure may first identify an average packet throughput of the first node at operation S711.

The average packet throughput is an average packet throughput calculated by the first node as a reference, and may be determined from a sum of PDU data being processed (e.g., transmitted to a terminal) by the first node for a specific time. As an example, if the determined average packet throughput is equal to or lower than 1 Mbps, the first node according to an embodiment of the disclosure may determine the average packet throughput as 1 Mbps.

If the average packet throughput is determined, the first node may identify a reference buffer size for buffering data so as to transmit the packet in accordance with the average packet throughput at operation S712.

The buffer of the first node according to an embodiment of the disclosure may have buffered the data for a specific size so that transmission is immediately performed without any latency at a time when the packet transmission is triggered by the terminal or network even without a separate request from the terminal. The reference buffer size according to an embodiment of the disclosure may correspond to the size of the data that has been buffered enough to secure the determined average packet throughput when the packet transmission is triggered to perform the transmission, and may be defined as a target buffer size.

The first node according to an embodiment of the disclosure may identify whether packet data waiting for transmission exists currently in the buffer. Further, the first node may identify whether an underflow occurs based on the packet data waiting for transmission at operation S713.

Whether an underflow occurs is to determine whether the buffer is in a state close to an empty state where data has not been buffered in the buffer, and the information related to the buffer state may be determined by reflecting whether the underflow occurs in the current buffer state.

For example, if it is determined that the current state corresponds to the underflow, the first node according to an embodiment of the disclosure may give a weight value in accordance with the underflow at operation S714.

If whether the underflow occurs is determined, the first node according to an embodiment of the disclosure may determine an available buffer size within the identified reference buffer size at operation S715.

Determination of the available buffer size may be understood as identification of the buffer size capable of additionally buffering the packet from the third node within the reference buffer size.

If the available buffer size is determined as described above, the first node according to an embodiment of the disclosure may generate the information related to the buffer state including the available buffer size at operation S716.

As described above, the generated information related to the buffer state may be periodically transmitted to the third node in the form of the DDDS.

For example, a method for determining the information related to the buffer state as described above with reference to FIG. 7 may be performed based on the following mathematical expression.

$$\text{desired\_buffer\_size} = \max\{\text{target\_buffering\_time} * \text{avg\_tput} * (\text{underflow\_count}+1)/1000/8 - \text{waiting\_bytes}, 0\}$$

In the above-described mathematical expression, desired_buffer_size means the requested buffer size as described above, and target_buffering_time means the above-described target buffering time. avg_tput means the average packet throughput of the first node as described above, and underflow_count means the number of successive underflow occurrences.

As described above, if the underflow is determined to occur, this may be reflected as the underflow_count value. For example, if it is determined that the packet data waiting for transmission in the first node is equal to or smaller than one packet size, the first node increases the underflow_count by 1, whereas if the packet data waiting for transmission is larger than one packet size, the first node may determine that the underflow does not occur, and thus it may initialize the underflow_count.

Figure 8:
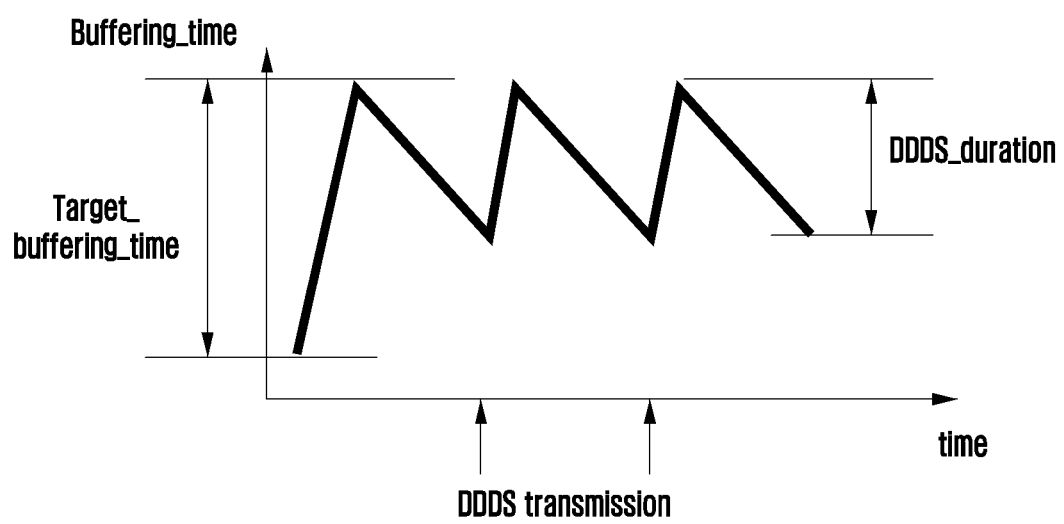
FIG. 8 is a diagram explaining a buffer state change of a first node according to an embodiment of the disclosure.

FIG. 8 is a diagram explaining a buffer state change of a first node according to an embodiment of the disclosure.

Referring to FIG. 8, it illustrates a graph in which a change of data being buffered in the buffer of the first node is illustrated in the unit of time in accordance with the passage of time. In the graph of FIG. 8, buffering_time on a vertical axis may be understood as a time required for the data transmission with respect to specific target_buffering_time and DDDS_Duration.

The first node according to an embodiment of the disclosure may configure a buffer amount required for underflow prevention as 20 ms. In this case, target_buffering_time illustrated in FIG. 8 may be 20 ms. If packet transmission is performed or a packet to be transmitted to the terminal is received in a state where data is buffered within the reference buffer size as described above, the buffer state of the first buffer may be changed. As an example, if packet transmission corresponding to about 10 ms is performed for 10 ms within the buffer of the first node, the buffering time initially starting at 20 ms is reduced to 10 ms after 10 ms.

In this case, as illustrated in FIG. 8, the information related to the changed buffer state of the first node may be transmitted to the third node as the DDDS. After the information related to the buffer state is reported, the third node according to an embodiment of the disclosure may transmit a packet that can reach the reference buffer size of the first node (packet corresponding to about 10 ms) to the first node.

As described above, the first node according to an embodiment of the disclosure may transmit the buffer state that is changed due to the packet transmission to the third node in accordance with a preconfigured duration, and the third node may control to properly transmit the packet to the first node so that the data can be buffered in the buffer of the first node within the reference buffer size.

Hereinafter, a method by a CU node (third node) according to an embodiment of the disclosure for determining and controlling a transmission path of a packet to be transmitted based on information reported from a DU node (first node or second node) or the corresponding packet will be described in detail.

Figure 9:
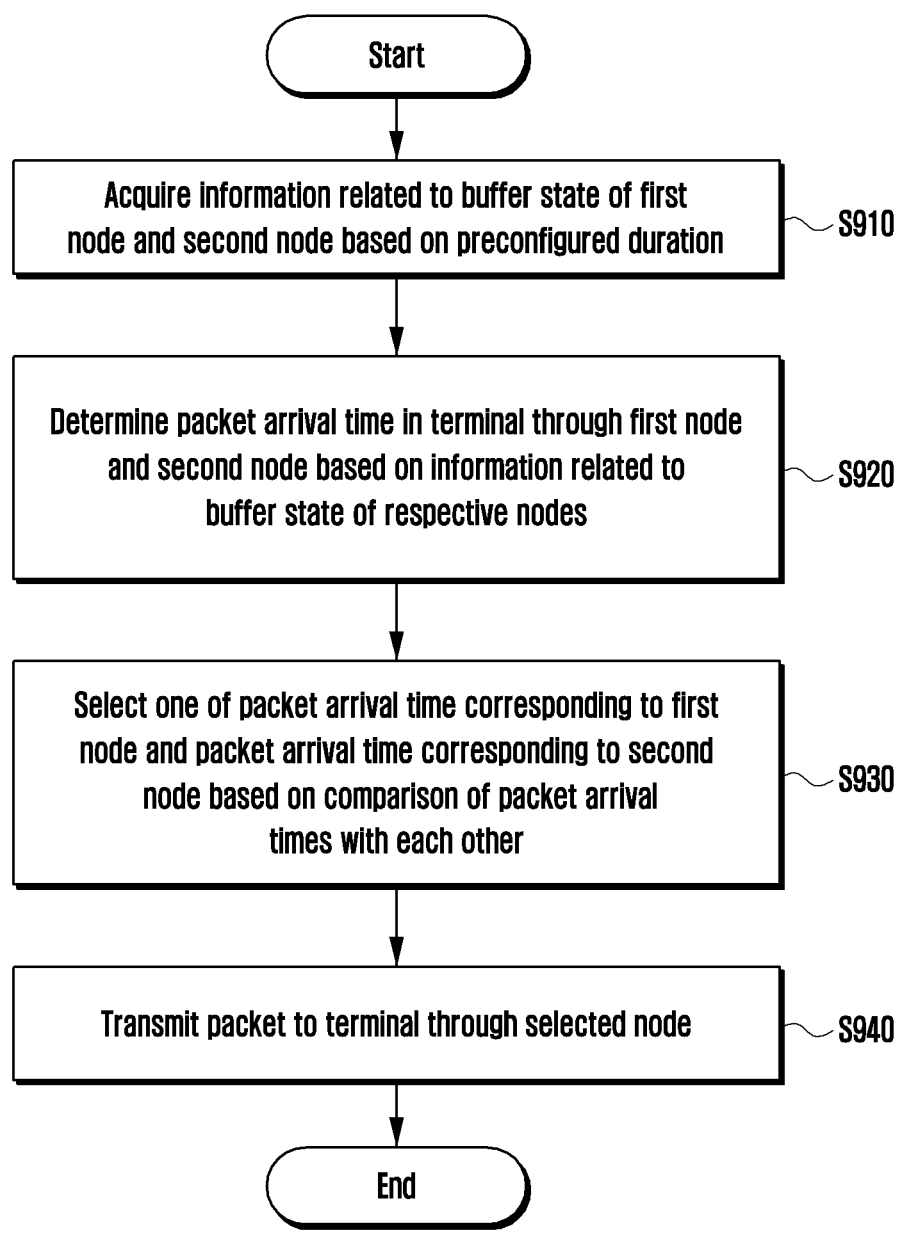
FIG. 9 is a flowchart schematically explaining a method by a third node for determining a packet transmission path to a first node or a second node according to an embodiment of the disclosure.
Figure 10:
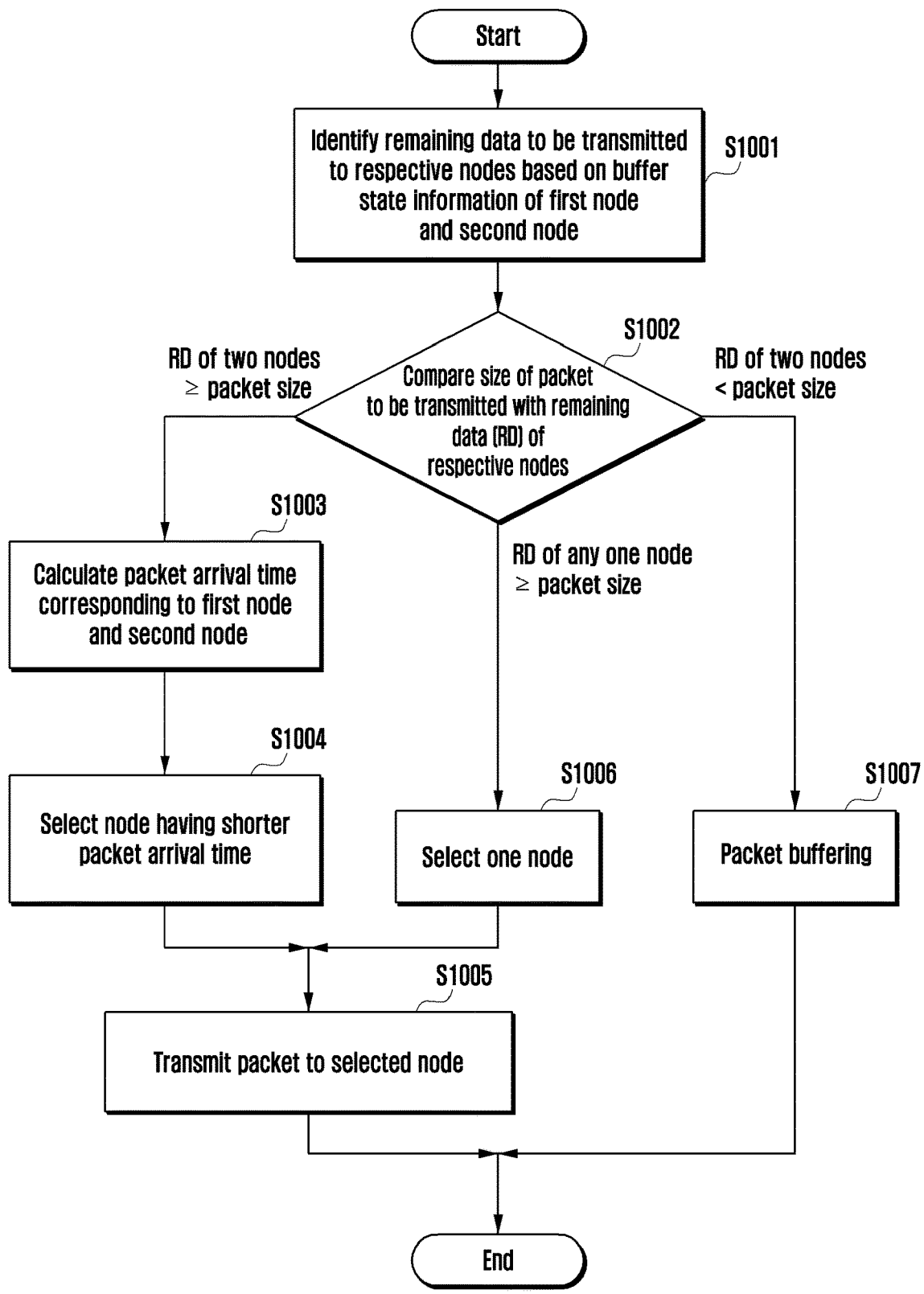
FIG. 10 is a flowchart explaining a detailed method by a third node for determining a packet transmission path according to an embodiment of the disclosure.

FIG. 9 is a flowchart schematically explaining a method by a third node for determining a packet transmission path to a first node or a second node according to an embodiment of the disclosure, and FIG. 10 is a flowchart explaining a detailed method by a third node for determining a packet transmission path according to an embodiment of the disclosure.

FIG. 9 is to explain a main operation of the third node to reduce a latency of packet transmission to a terminal, and FIG. 10 is to explain the overall operation of the third node to configure a packet transmission path according to an embodiment of the disclosure. However, the operational feature of the third node according to the disclosure is not limited to an embodiment according to any one drawing.

Referring to FIG. 9, the third node according to an embodiment of the disclosure may acquire information related to buffer states of a first node and a second node at operation S910.

For example, the third node according to an embodiment of the disclosure may periodically receive a report of the information related to the buffer state generated according to the above-described embodiment from the first node and the second node.

As described above, if the information related to the buffer states of the respective nodes is acquired, the third node according to an embodiment of the disclosure may calculate a packet arrival time when it is expected that packets are received in the terminal when the corresponding packets are transmitted through the first node and the second node at operation S920.

The packet arrival time in the terminal through the first node and the second node may be determined based on a sum of a link latency in which packets are delayed on links connected between the third node and the respective nodes and an expected buffering time in which the packets are buffered in buffers of the respective nodes before the packets are transmitted to the terminal in the case where the packets are transferred to the respective nodes.

The link latency may be a latency occurring on the links connected between the third node and the respective nodes due to a physical distance between the third node and the first node or between the third node and the second node, and it may mean a time when the latency occurs on the link itself regardless of the data transmission. For example, the link latency is a latency occurring on an ×2 interface or an f1 link, and the third node according to an embodiment of the disclosure may periodically measure and secure the link latency. In applying the link latency, as an example, if a report of the information related to the buffer state from the first and second nodes is not once received, the third node may determine the latency of the corresponding link by reflecting zero (0) value in the latency.

For example, the third node according to the disclosure may transmit a packet for latency measurement including a timestamp to a link for the first node and a link for the second node for each specific link measurement section. If a response is received from the first node and the second node corresponding to the transmission of the packet for latency measurement, the third node updates the latency value of the corresponding link using the timestamp of the packet for latency measurement. In this case, if the response to the transmission of the packet for latency measurement is not received from at least one of the first node and the second node until the next link measurement section, the third node may maintain the existing latency value for the corresponding link.

The expected buffering time when it is expected that the packet is buffered in the first and second nodes according to an embodiment of the disclosure may be determined based on the information related to the buffer state, a reference buffer size in the buffers of the first and second nodes, and the DDDS transmission duration.

The third node according to an embodiment of the disclosure may calculate the expected buffering time of the packet on the first and second nodes in accordance with the following mathematical expression.

$$\text{estimated\_buffering\_time} = \text{Target\_buffering\_time} - \text{remaining\_data}/\text{desired\_buffer\_size} * \text{DDDS\_duration}$$

estimated_buffering_time means the expected buffering time of the packet, and Target_buffering_time means the time when the packet is buffered in the reference buffer size of the first and second nodes. The third node may pre-store the information on the reference buffer size of the first and second nodes. desired_buffer_size may mean the information related to the buffer state reported from the first and second nodes, and DDDS_duration may mean a duration in which the first and second nodes report the information related to the buffer state.

remaining_data means remaining data that should be transmitted to the first and second nodes. The third node may continuously record and update the remaining data that should be transmitted to the first and second nodes. For example, if the information related to the buffer state is reported from the first and second nodes, the third node according to the disclosure may record the remaining data that should be transmitted to the first and second nodes based on the reported information. Thereafter, if the packet is transmitted to any one of the first and second nodes, the third node according to the disclosure may update the remaining data information of the corresponding node after subtracting the size of the transmitted packet from the remaining data corresponding to the node on which the packet is transmitted.

As described above, if the packet arrival time for the first and second nodes is determined, the third node may select any one node based on comparison of the packet arrival time corresponding to the first node with packet arrival time corresponding to the second node at operation S930, and may transmit the packet to the terminal through the selected node at operation S940.

As an example, the third node according to the disclosure may determine the transmission path so as to transmit the packet through the node corresponding to a shorter time of the packet arrival time corresponding to the first node and the packet arrival time corresponding to the second node. This will be described later with reference to FIG. 10.

Accordingly, the third node according to the disclosure may properly select the packet transmission path to minimize the latency in consideration of the buffer state of the first and second nodes while maximizing the path utilization of the first node and the second node, and it may transfer the packet to the terminal through one of the first node and the second node, which can transfer the packet most quickly, so that the latency in the packet transmission can be effectively reduced.

If the packet to be transmitted to the terminal is generated, the third node according to the disclosure may not collectively calculate and compare the packet arrival times, but may first identify whether the packet can be transmitted.

Referring to FIG. 10, if the packet to be transmitted to the terminal is generated, the third node according to an embodiment of the disclosure may identify the remaining data that should be transmitted to the respective nodes based on the information related to the buffer state of the first node and the second node at operation S1001.

The remaining data may be identified according to the method as described above with reference to FIG. 9. In this case, although it is described that the remaining data is based on the information related to the buffer state received from the first and second nodes, the remaining data of the first and second nodes may be identified and updated depending on whether there is the packet previously transmitted to the respective nodes and in accordance with the information related to the buffer state.

As described above, if the remaining data of the first and second nodes is identified, the third node may compare the size of the packet to be transmitted to the terminal with the remaining data of the first and second nodes at operation (S1002.

For example, if both the remaining data corresponding to the first node and the remaining data corresponding to the second node are larger than the size of the packet to be transmitted, the third node may calculate the packet arrival time corresponding to the first node and the second node with reference to FIG. 9 as described above at operation S1003, and may select a node having a shorter packet arrival time as the node for the packet transmission at operation S1004.

In contrast with this, if it is identified that only the remaining data of any one of the first and second nodes is equal to or larger than the size of the packet, the third node may select the node having the remaining data that is equal to or larger than the size of the packet as the node to transmit the packet at operation S1006.

Further, if both the remaining data of the first and second nodes are smaller than the size of the packet, the third node determines that the current state is not a state where the packet is to be transmitted to the terminal, and may buffer the corresponding packet in the third node at operation S1007.

According to an embodiment of the disclosure, the third node first determines whether the corresponding packet should be currently transmitted in consideration of the size of the packet to be transmitted, and in the case where the corresponding packet can be transmitted to any node, the third node may compare the packet arrival times of the first and second nodes with each other, so that the packet transmission path can be properly controlled in accordance with the situation and the packet transmitted to the selected node in operation S1005.

Figure 11:
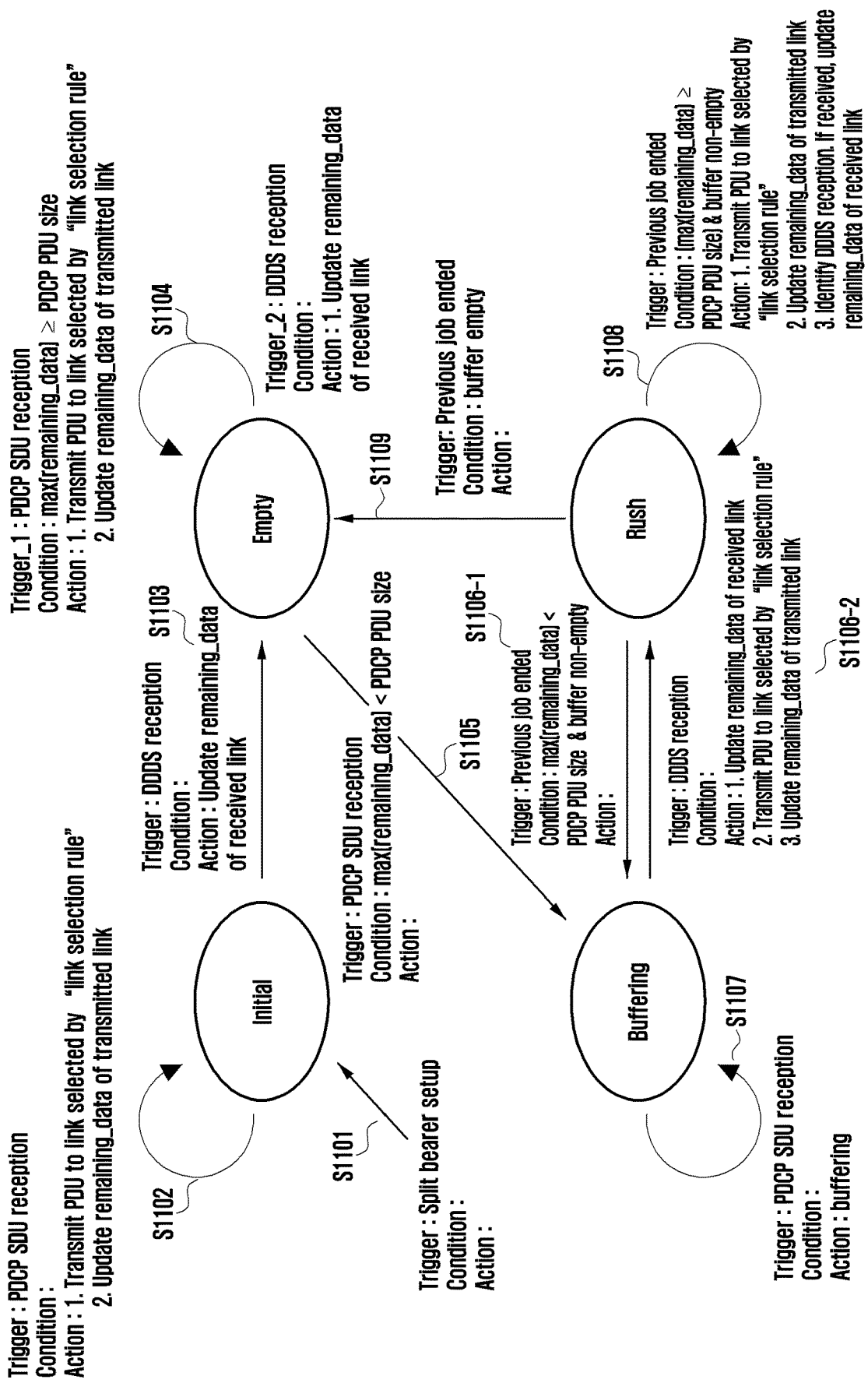
FIG. 11 is a block diagram explaining a state in accordance with a trigger condition of a third node according to an embodiment of the disclosure.

FIG. 11 is a diagram explaining a state in accordance with a trigger condition of a third node according to an embodiment of the disclosure.

Referring to FIG. 11, first, according to an embodiment of the disclosure, a DC may be configured with respect to a terminal, and a split bearer may be configured (S1101).

If a packet (PDCP PDU) to be transmitted to the terminal is received, the third node in an initial state where the split bearer is configured transmits the corresponding PDU through selection of any one path in accordance with the above-described method for determining the packet transmission path, and updates the remaining data of the node corresponding to the transmission path through reflection of the size of the transmitted packet in the remaining data (S1102).

In this case, if the DDDS is received from the first node and the second node, it is possible to update the remaining data of the first and second nodes based on the received DDDS (S1103).

Thereafter, if the PDCP PDU to be transmitted to the terminal is generated, the third node may transmit the packet through a path selected according to the above-described method for determining the packet transmission path by comparing the recorded and updated remaining data of the first and second nodes with the size of the PDCP PDU to be transmitted, and it may update the remaining data. In the same manner, if the DDDS is received from the first node and the second node, the third node may update the remaining data of the first and second nodes based on the received DDDS (S1104).

As described above, if the PDCP PDU is transmitted to any one of the first and second nodes, the third node is in an empty state where buffered data is absent, but the remaining data of the first and second nodes may be smaller than the size of the PDCP PDU to be transmitted (S1105), in this case, the third node may buffer the corresponding PDCP PDU (S1107).

On the other hand, if the specific work, such as the packet transmission or buffering, is ended in the third node, the size of the PDCP PDU may be larger than the maximum remaining data of the first node and the second node, and the packet may be in a buffered state (S1106-1). In this case, if the DDDS is received from the first node and the second node, the third node may update the remaining data recorded with respect to the first node and the second node, transmit the packet according to the above-described method for determining the packet transmission path, and then update again the remaining data of the respective nodes through reflection of the packet transmission in the remaining data (S1106-2).

If the specific work, such as the packet transmission, is ended in the third node, the maximum remaining data of the first node and the second node is larger than the size of the PDCP PDU, and the third node is not in an empty state, the third node according to the disclosure may transmit the packet according to the above-described method for determining the packet transmission path, and it may update the remaining data for the respective nodes based on the transmitted packet and the received DDDS (S1108). When the above-described operation is repeatedly performed, the third node may be in a rush state.

Thereafter, if the specific work, such as the data transmission, is entirely ended, the buffer of the third node may be in an empty state (S1109).

Figure 12:
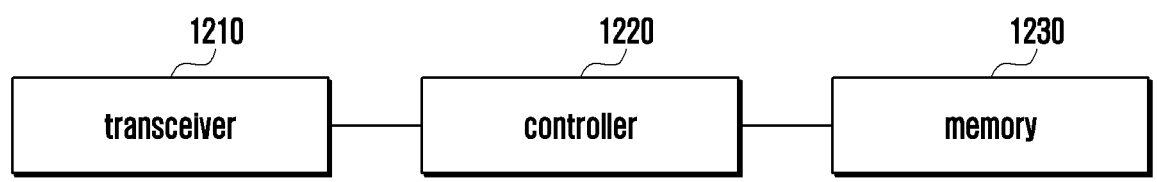
FIG. 12 is a block diagram illustrating the configuration of first to third nodes according to an embodiment of the disclosure.
Figure 13:
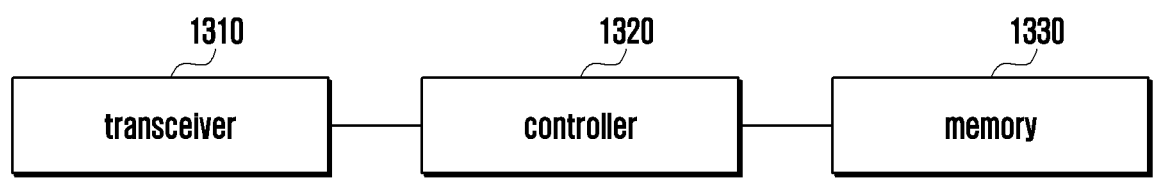
FIG. 13 is a block diagram illustrating the structure of a terminal according to an embodiment of the disclosure.

FIG. 12 is a block diagram illustrating the configuration of first to third nodes according to an embodiment of the disclosure, and FIG. 13 is a block diagram illustrating the structure of a terminal according to an embodiment of the disclosure.

Referring to FIG. 12, each of the first to third nodes according to the disclosure may include a transceiver 1210, a controller 1220, and a memory 1230.

As an example, the transceiver 1210 of the first node and the second node may perform wireless communication with a terminal through an RF module or the like, may be connected to the third node through a specific link (×2 interface or f1), and may be configured to transmit buffer related status information to the third node and to receive a packet from the third node.

The transceiver 1210 of the third node may transmit the packet to the first and second nodes through the specific link, or may receive DDDS from the first and second nodes.

In an example, the controller 1220 of the first and second nodes may calculate an average packet throughput, generate information related to a buffer state based on the calculated average packet throughput, and control the transceiver 1210 to periodically transmit the generated information related to the buffer state.

The controller 1220 of the third node may determine whether to transmit the corresponding packet based on the information related to the buffer state acquired from the first and second nodes or the size of the packet to be transmitted to the terminal, and if the transmission of the corresponding packet is determined, the controller 1220 may determine and control the path for transmission to any one of the first node and the second node.

The memory 1230 of the first to third nodes may store at least one of information transmitted or received through the transceiver 1210 and information generated through the controller 1220.

Referring to FIG. 13, a terminal according to the disclosure may include a transceiver 1310, a controller 1320, and a memory 1330.

According to an embodiment, the transceiver 1310 of the terminal may perform wireless communication with at least one node, and as an example, it may receive a packet from the first node and the second node.

The controller 1320 of the terminal may control the transceiver 1310 to receive the packet from the first node and the second node through a split bearer, and it may control a PDCP to perform reordering to report the received packets to a higher layer.

The memory 1330 of the terminal may store at least one of information related to the packet transmitted or received through the transceiver 1310 and information generated through the controller 1320.

It should be understood to those of ordinary skill in the art to which the disclosure pertains that the disclosure can be embodied in other detailed forms without changing the technical subject matter or essential features of the disclosure. Accordingly, the embodiments as described above should be understood as exemplary but not limited in all aspects. Accordingly, the scope of the disclosure should not be limited to the above-described embodiments, but should be defined by not only the claims but equivalents thereof.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A method performed by a third node in a wireless communication system, the method comprising:
    obtaining first buffer state information on a first node and second buffer state information on a second node, wherein the first node and the second node are connected to the third node through a split bearer;
    determining a first expected packet arrival time through the first node based on the first buffer state information and a first expected buffering time at the first node;
    determining a second expected packet arrival time through the second node based on the second buffer state information and a second expected buffering time at the second node;
    selecting of a node between the first node and the second node based on the first expected packet arrival time and the second expected packet arrival time; and
    transmitting, to a terminal, a packet through the selected node.

2. The method of claim 1, further comprising:
    identifying a first remaining data to be transmitted to the first node and a second remaining data to be transmitted to the second node; and
    comparing the first remaining data and the second remaining data with a size of the packet,
    wherein, in case that only the first remaining data is larger than the size of the packet, the selected node corresponds to the first node.

3. The method of claim 2,
    wherein, in case that both of the first remaining data and the second remaining data are larger than the size of the packet, the first expected packet arrival time and the second expected packet arrival time are determined, and
    wherein, in case that the first expected packet arrival time is shorter than the second expected packet arrival time, the selected node corresponds to the first node.

4. The method of claim 2,
    wherein the first buffer state information includes information on a link latency between the first node and the third node,
    wherein the second buffer state information includes information on a link latency between the second node and the third node,
    wherein the first expected buffering time is determined based on the first remaining data and the first buffer state information, and
    wherein the second expected buffering time is determined based on the second remaining data and the second buffer state information.

5. The method of claim 1,
    wherein the first buffer state information includes information on an available buffer size at the first node,
    wherein the second buffer state information includes information on an available buffer size at the second node,
    wherein the available buffer size at the first node is determined based on a reference buffer size for buffering data at the first node and packet data waiting for a transmission at the first node, and
    wherein the available buffer size at the second node is determined based on a reference buffer size for buffering data at the second node and packet data waiting for a transmission at the second node.

6. The method of claim 3, further comprising:
    in case that the packet is transmitted, updating the first remaining data or the second remaining data.

7. A method performed by a first node in a wireless communication system, the method comprising:
    generating first buffer state information based on an average packet throughput;
    transmitting, to a third node, the first buffer state information, wherein the first node and a second node are connected to the third node through a split bearer; and
    transmitting, to a terminal, a packet in case that the packet is received from the third node, wherein the first buffer state information is used for the third node to determine a first expected packet arrival time at the terminal through the first node,
wherein the packet is received if the first node is selected by the third node based on a comparison of the first expected packet arrival time with a second expected packet arrival time at the terminal through the second node, and
wherein the first expected packet arrival time is determined based on a link latency between the first node and the third node, and an expected buffering time of the packet at the first node.

8. The method of claim 7, wherein generating the information related to the buffer state comprises:
identifying a reference buffer size for buffering data to secure the average packet throughput;
determining an available buffer size within the reference buffer size based on packet data waiting for a transmission at the first node; and
generating the first buffer state information including the information on the available buffer size.

9. The method of claim 7, wherein the first expected buffering time is determined based on a first remaining data to be transmitted to the first node, which is identified by the third node, the first buffer state information, and a duration in which the information related to the buffer state is transmitted.

10. A third node in a wireless communication system, the third node comprising:
a transceiver; and
at least one processor configured to:
obtain first buffer state information on a first node and second buffer state information on a second node, wherein the first node and the second node are connected to the third node through a split bearer,
determine a first expected packet arrival time through the first node based on the first buffer state information and a first expected buffering time at the first node,
determine a second expected packet arrival time through the second node based on the second buffer state information and a second expected buffering time at the second node,
select a node between the first node and the second node based on the first expected packet arrival time and the second expected packet arrival time, and
transmit, to a terminal, a packet terminal through the selected node.

11. The third node of claim 10,
wherein the at least one processor is further configured to:
identify a first remaining data to be transmitted to the first node and a second remaining data to be transmitted to the second node, and
compare the first remaining data and the second remaining data with a size of the packet, and
wherein, in case that only the first remaining data is larger than the size of the packet, the selected node corresponds to the first node.

12. The third node of claim 11,
wherein,
in case that both of the first remaining data and the second remaining data are larger than the size of the packet, the first expected packet arrival time and the second expected packet arrival time are determined, and
wherein, in case that the first expected packet arrival time is shorter than the second expected packet arrival time, the selected node corresponds to the first node.

13. The third node of claim 11,
wherein the first buffer state information includes information on a link latency between the first node and the third node,
wherein the second buffer state information includes information on a link latency between the second node and the third node,
wherein the first expected buffering time is determined based on the first remaining data and the first buffer state information, and
wherein the second expected buffering time is determined based on the second remaining data and the second buffer state information.

14. The third node of claim 10,
wherein the first buffer state information includes information on an available buffer size at the first node,
wherein the second buffer state information includes information on an available buffer size at the second node,
wherein the available buffer size at the first node is determined based on a reference buffer size for buffering data at the first node and packet data waiting for a transmission at the first node, and
wherein the available buffer size at the second node is determined based on a reference buffer size for buffering data at the second node and packet data waiting for a transmission at the second node.

15. The third node of claim 12, wherein the at least one processor is further configured to:
in case that the packet is transmitted, update the first remaining data or the second remaining data.

16. A first node in a wireless communication system comprising:
a transceiver; and
at least one processor configured to:
generate first buffer state information based on an average packet throughput,
transmit, to a third node, the first buffer state information, wherein the first node and a second node are connected to the third node through a split bearer, and
transmit, to a terminal, a packet in case that the packet is received from the third node,
wherein the first buffer state information is used for the third node to determine a first expected packet arrival time at the terminal through the first node,
wherein the packet is received if the first node is selected by the third node based on a comparison of the first expected packet arrival time with a second expected packet arrival time at the terminal through the second node, and
wherein the first expected packet arrival time is determined based on a link latency between the first node and the third node, and an expected buffering time of the packet at the first node.

17. The first node of claim 16, wherein the at least one processor is further configured to:
identify a reference buffer size for buffering data to secure the average packet throughput,
determine an available buffer size within the reference buffer size based on packet data waiting for a transmission at the first node, and
generate the first buffer state information including the information on the available buffer size.

18. The first node of claim 16,
wherein the first expected buffering time is determined based on a first remaining data to be transmitted to the first node, which is identified by the third node, the first buffer state information, and a duration in which the information related to the buffer state is transmitted.

* * * * *